April 9, 1929.  T. L. GREEN  1,708,089
BISCUIT CUTTING AND EMBOSSING MACHINE
Filed April 23, 1927   5 Sheets-Sheet 4
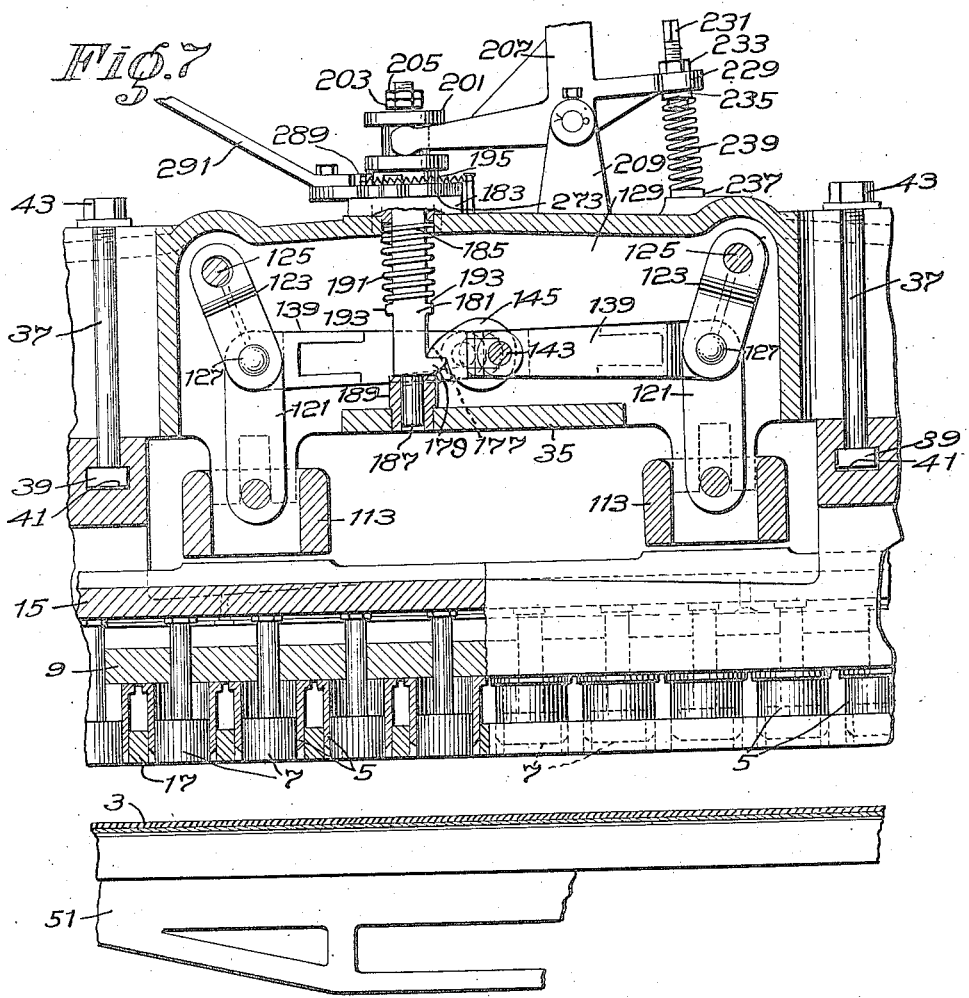
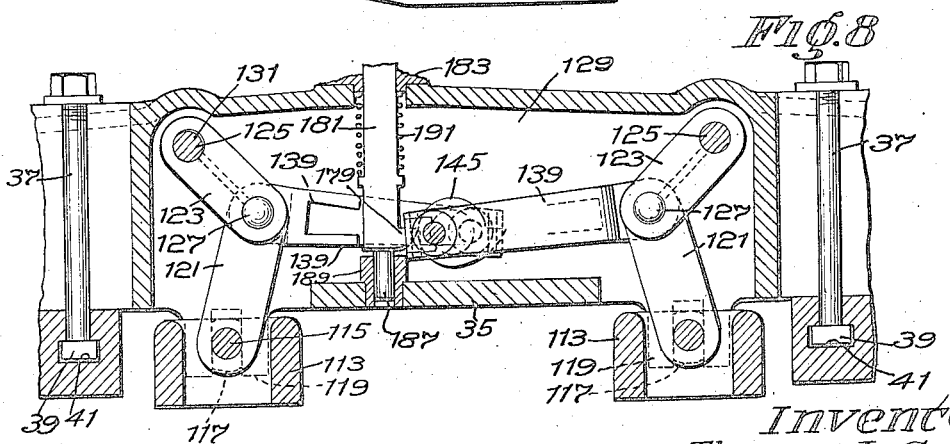
Inventor:
Thomas L. Green
By Henry T. Williams
Attorney April 9, 1929.　　　　　T. L. GREEN　　　　　1,708,089
BISCUIT CUTTING AND EMBOSSING MACHINE
Filed April 23, 1927　　　5 Sheets-Sheet 5
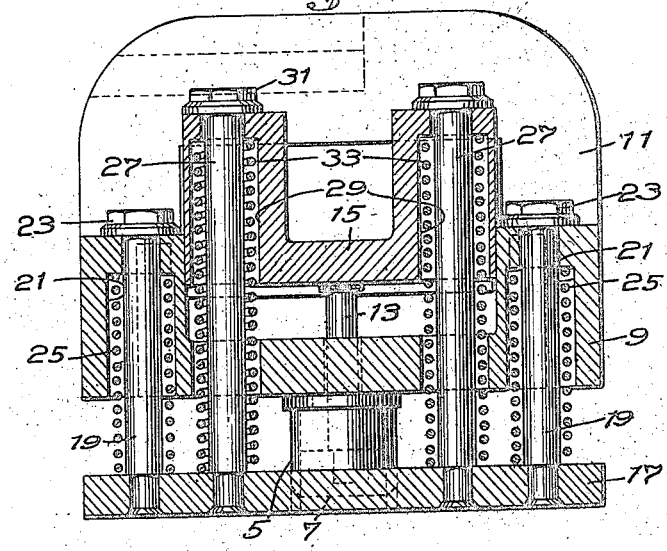
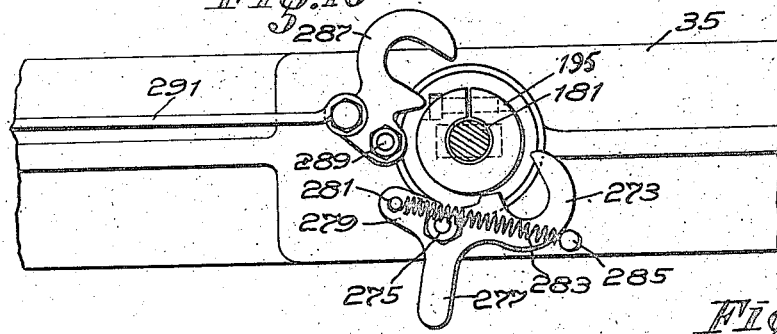
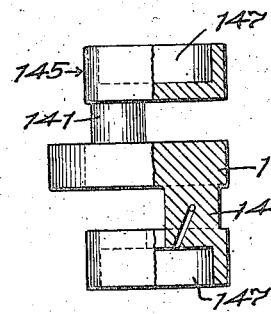
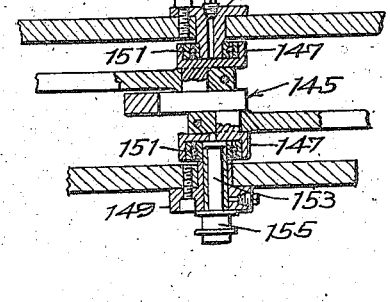
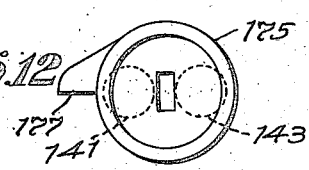
Inventor:
Thomas L. Green
By Henry T. Williams,
Attorney Patented Apr. 9, 1929.

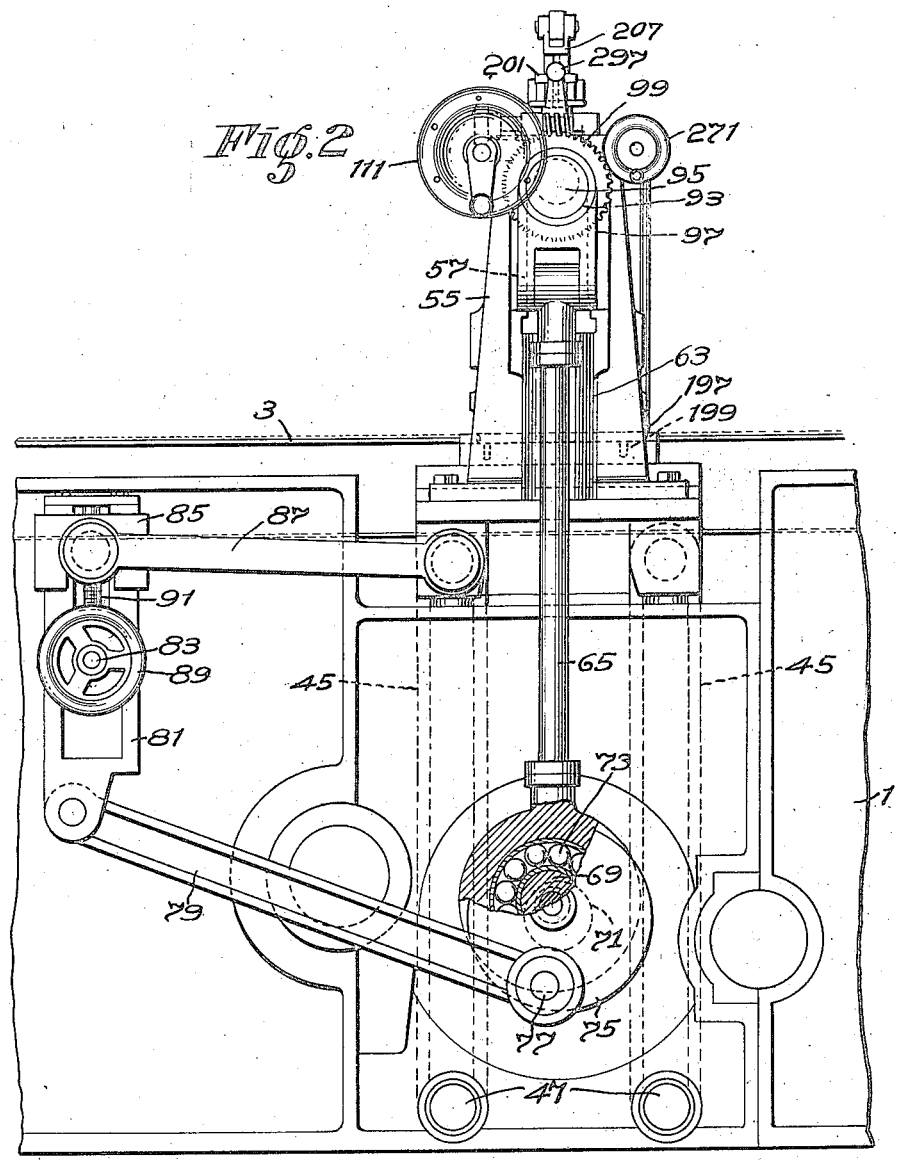

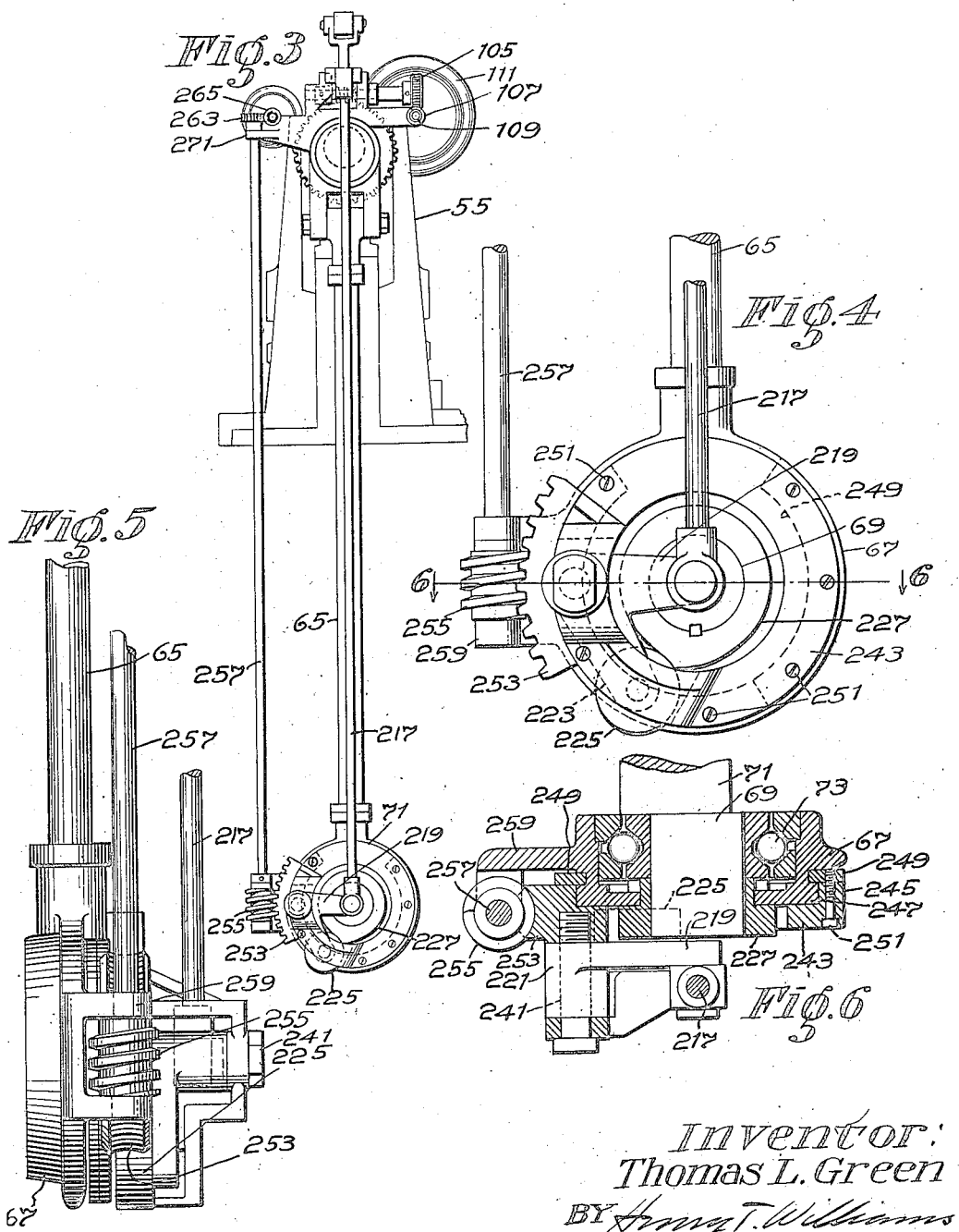

1,708,089

UNITED STATES PATENT OFFICE.

THOMAS L. GREEN, OF INDIANAPOLIS, INDIANA.

BISCUIT CUTTING AND EMBOSSING MACHINE.

Application filed April 23, 1927, Serial No. 186,020, and in Germany November 20, 1926.

The invention to be hereinafter described relates to a machine for cutting and embossing biscuits. The invention is applicable to machines in which a sheet of dough or plastic material is fed by an endless web or apron continuously or step-by-step beneath vertically reciprocating cutters and embossers mounted on a carrier which, in the case of the continuously fed apron, is reciprocated or oscillated so that the cutters and embossers are moved in unison with the travel of the sheet when acting thereon.

The embossers and cutters advance toward the dough sheet with the embossers in the lead so that they engage the sheet and make their impress prior to cutting out biscuits from the sheet. Then the embossers retreat from the sheet and tend to lift the same somewhat from the apron before the cutters engage the sheet. This movement of the embossers relatively to the cutters causes the cutters to clear the sheet from the embossers. Next the cutters move down to die out the biscuits from the sheet, and then move upward somewhat beyond the embossers so that the latter in turn clear the died-out biscuits from the cutters. The cutters also move upward relatively to a stripper plate which clears from the cutters the scrap dough surrounding the died-out biscuits.

The cutters and embossers are carried by a single reciprocatory cross-head, but the embossers are retracted from the dough sheet by a mechanism which is so sensitive and quick acting that the instant the embossers complete their impress on the dough sheet, they are snapped up therefrom.

A machine of this type is disclosed in the copending application of Thomas L. Green and Charles H. Williams, Serial No. 62,350, filed October 14, 1925 now Patent No. 1,660,553, granted Feb. 28, 1928. In said machine spring means is energized as the embossers approach the dough sheet, and immediately upon completion of the impress on the sheet by the embossers, they are snapped up by the spring means away from the sheet and toward the cross-head. The spring means is rendered effective to retreat the embossers from the sheet by a toggle and double crank mechanism carried by the cross-head and having a latch cooperating therewith which is tripped to cause the relaxing of the toggle mechanism each time the embossers impress the dough sheet, said toggle mechanism being arranged to restore itself into position to cause tensioning of the spring means when the embossers approach the dough sheet.

In the machine of said application the means for tripping the latch comprises a rod carried by the cross-head and having a nut thereon urged toward a stop on the cross-head by a coil spring encircling the rod. At the upper end of the latch rod is a button which, as the embossers approach the limit of their downward movement, is brought into engagement with a stop on a fixed bridge bar above the cross-head, thereby arresting downward movement of the latch rod. When the cross-head moves further downward it trips the latch and the double crank turns and the toggles buckle to their releasing position, thereby allowing the spring means to snap the embossers up from the dough sheet.

This is a good form of means for automatically causing the latch to trip the toggle mechanism, but it has been found desirable to provide means for this purpose which enables the latch to be tripped more rapidly and positively. One of the objects of the present invention, therefore, is to provide improved means for this purpose.

In carrying this feature of the invention into practical effect, the latch is intermittently tripped by a cam, its follower, and connections from the follower to the latch, the operation of the cam being appropriately timed with respect to the reciprocation of the cross-head. Also, the construction is such that the follower may be readily adjusted circumferentially of the cam so that the embossers may operate upon dough sheets of varying thicknesses.

At times it is desirable temporarily to interrupt the embossing operation, as for example, when imperfect portions of the dough sheet are approaching the embossers and cutters, and at other times it is desirable to cut, but not emboss biscuits. Another object of the invention is to provide simple and efficient means cooperating with the latch and the cam follower for the accomplishment of these purposes.

The character of the invention may be best understood by reference to the following description of one good embodiment thereof disclosed in the accompanying drawings, wherein:

Fig. 2 is a front side elevation of a portion of the machine;

Fig. 3 is a rear side elevation of a portion of the machine showing the cam and follower means for operating the latch;

Figure 1:
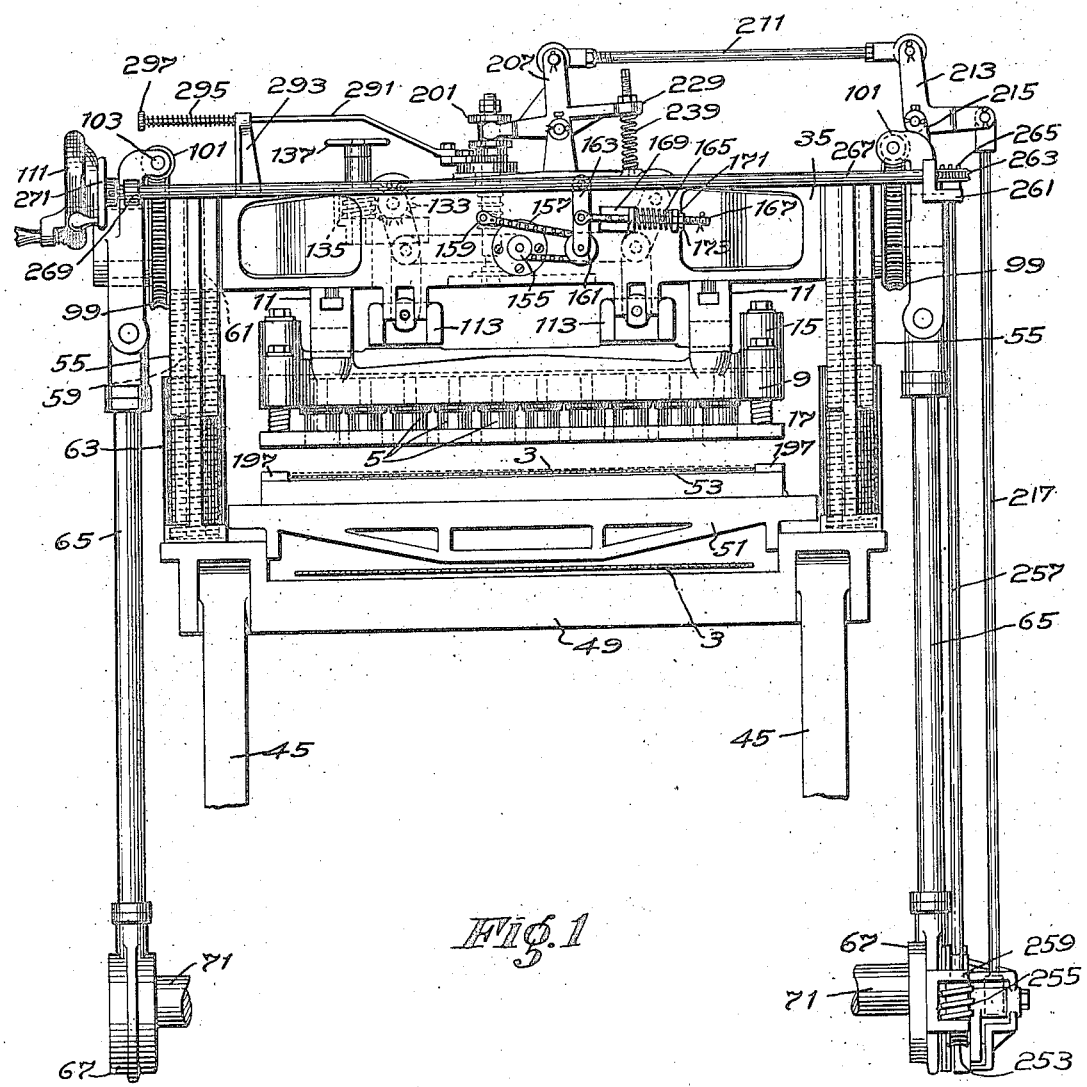
Fig. 1 is an elevation of a portion of a biscuit cutting and embossing machine embodying the invention.

Fig. 4 on an enlarged scale is a side view of the crank and strap of one of the connecting rods for reciprocating the cross-head, and the cam and follower means associated therewith;

Fig. 5 is an end elevation of the construction shown in Fig. 4;

Fig. 6 is a horizontal section taken on line 6—6 of Fig. 4;

Fig. 7 on an enlarged scale is a view partly in elevation and partly in section of a portion of the mechanism shown in Fig. 1, and showing the toggle and double crank mechanism in holding position;

Fig. 8 is a vertical section through a portion of the cross-head and showing the toggle and double crank mechanism in releasing position;

Fig. 9 is a transverse section through the cutter and embosser heads;

Fig. 10 on an enlarged scale is a plan of the portion of the cross-head showing the hooks for cooperation with the latch rod to interrupt the embossing operations;

Fig. 11 is a view partly in plan and partly in section of the double crank;

Fig. 12 is an end view of the double crank; and

Fig. 13 is a horizontal section through a portion of the cross-head box.

Referring to the drawings, the portion of the biscuit cutting and embossing machine shown therein as one good form of the invention, comprises a pair of side plates 1 (Fig. 2) which extend the length of the machine and carry the usual rollers and driving means (not shown) for causing the travel of the endless apron 3, the upper run of which is adapted to convey the dough sheet beneath the cutters and embossers.

Cutters 5 (Figs. 7 and 9) are provided, in the present instance of cup form, and within the cutters are embossers 7, in the present instance of plunger form. The cutters are secured to a channel-shaped cutter-head 9 (Figs. 1, 7 and 9) provided with a pair of yokes 11 bridging the cutter-head adjacent opposite ends thereof. The embossers are secured to the lower ends of stems 13 which are entered through holes in the bottom of the cutter-head. The upper ends of said stems are secured to a channel-shaped embosser-head 15 slidable between flanges of the channel-shaped cutter-head.

Beneath the cutter-head is a clearer plate 17 having holes for receiving the cutters. This plate is connected to the cutter-head by studs 19 which pass through pockets 21 in the cutter-head, the upper ends of said studs having heads 23 adapted to engage the upper surfaces of the cutter-head flanges. Coil springs 25 encircle the studs, enter the pockets, and are confined between the clearer plate and ends of the pockets. The construction is such that the springs urge the clearer plate downward until limited by engagement of the stud heads 23 with the upper surfaces of the cutter-head flanges, but the clearer plate is susceptible of movement upward relatively to the cutter-head, as will be more fully hereinafter described.

The embosser-head is yieldingly supported by the clearer plate. To accomplish this, studs 27 are provided having their lower ends secured to the clearer plate. These studs pass through holes in the bottom of the cutter-head and through pockets 29 in flanges of the channel-shaped embosser-head. At the ends of these studs are heads 31 adapted for engagement with the upper surfaces of the embosser-head flanges. Coil springs 33 encircle the studs, enter the pockets and are confined between the clearer plate and the ends of the pockets. The construction is such that the coil springs urge the embosser-head upward away from the clearer plate until limited by engagement of the upper surfaces of the embosser-head with the stud heads 31.

The cutter carrying head, the embosser carrying head, the clearer plate and the studs and springs just described, constitute a unit which is adapted to be detachably secured to the cross-head 35 (Figs. 1, 7 and 8) by bolts 37 extending vertically through the cross-head and having heads 39 entered into T-shaped slots 41 in the cutter-head yokes 11 referred to. At the upper ends of the bolts are nuts 43 engaging the top of the cross-head. The construction is such that the cutter and embosser unit may be laterally presented to the cross-head, and in the course of this movement the yoke slots 41 will slide along the bolt heads 39 until limited by engagement of the ends of the slots with the bolt heads. Thereupon, the nuts 43 may set up, thereby securely to connect the cutter and embosser unit to the cross-head. The machine may be equipped with a complement of cutter and embosser units for work of varying character, and the construction is such that one unit may be quickly and easily substituted for another.

The cross-head is on a carrier or frame which is reciprocable in a horizontal direction, in order that the cutters and embossers may be moved in unison with a continuously travelling dough sheet while operating thereon. This carrier comprises pairs of rocker arms 45 (Figs. 1 and 2) at opposite sides of the machine and adapted to oscillate with parallel motion about the axes of shafts 47 mounted on the side plates 1, referred to, of the machine. The upper ends of the rocker arms are connected to a saddle 49 carrying a bed plate 51 over which the upper run of the apron 3, referred to, passes, a suitable pad 53 being interposed between the bed plate and the apron.

Mounted on the saddle on opposite ends thereof are stands 55 (Figs. 1 and 2) having guideways 57 in which the cross-head is adapted to vertically reciprocate. Cushioning coil springs 59 (Fig. 1) encircle rods 61 depending from the cross-head, said springs having portions occupying deep cups 63 mounted on the saddle. The upper ends of the springs bear against the cross-head.

The means for reciprocating the cross-head in the guideways of the stands comprises connecting rods 65 having their upper ends connected to the cross-heads and their lower ends connected to straps 67 receiving crank wrist pins 69 on a shaft 71 which may be driven in any suitable manner. Ball bearings 73 are provided between the straps and wrist pins.

The means for horizontally reciprocating the cutter and embosser carrier comprises a disk 75 mounted on the front end of the crank shaft 71, and has a wrist pin 77 connected by a connecting rod 79 with the lower end of one of a pair of rocker arms 81 mounted on a shaft 83. On the upper ends of the rocker arms are blocks 85 connected by links 87 with the saddle 49 referred to. The extent of oscillation of the cutter and embosser carrier may be varied by adjusting the blocks 85 along the rocker arms by means of a hand wheel 89 operating through mitre gears and screws 91 as is understood in the art.

It is desirable to adjust the cutter bar in order that the embossers and cutters shall have the required relation to the bed plate and the dough sheet. To accomplish this, eccentric sleeves 93 (Fig. 1) are interposed between the trunnions 95 of the cross-head and sleeves 97 at the upper ends of the connecting rods. The eccentric sleeves are provided with worm wheels 99 meshing with worms 101 on short shafts 103. On these short shafts are worm gears 105 (Fig. 3) which mesh with worms 107 on a long shaft 109 extending across the machine and having a hand wheel 111 at the front side of the machine. The operator may turn this hand wheel and through the gearing described adjust the eccentric sleeves, thereby to raise or lower the cross-head with limited adjustment.

Next will be described the toggle and double crank mechanism carried by the cross-head and operable alternately to permit and prevent movement of the embosser-head and embossers away from the dough sheet and toward the cross-head. This mechanism comprises a pair of shoes 113 (Figs. 1, 7 and 8) having pins 115 provided with flat-faced collars 117 adapted to slide in guide forks 119 depending from the cross-head. The shoe pins 115 are connected to toggles, each comprising a lower link 121 and an upper link 123. The upper links are pivotally connected to studs 125 on the cross-head. The links 121 and 123 have meeting overlapping forked ends through which pass hinge pins 127. The cross-head is formed to provide a box 129 for encasing the toggle and double crank mechanism. At the bottom of the box are openings through which the lower links of the toggles extend.

One of the toggles may be adjustable in order that proper alinement of the embosser-head in relation to the bed plate may be had. To this end the left toggle stud 125 (Figs. 7 and 8) has an eccentric portion 131 receiving the upper link of said toggle. Fast on said stud is a worm gear 133 (Fig. 1) meshing with a worm 135 on a shaft projecting up from the cross-head and provided with a hand wheel 137. This hand wheel may be turned and operate through the worm and worm gear to give the desired adjustment to the eccentric which will be held by the worm and worm gear in its different positions of adjustment.

Connecting rods 139 have ends connected to the toggle hinge pins 127, and their opposite ends connected to wrist pins 141 and 143 of a double crank 145 (Figs. 7, 8, 11 and 12). This double crank has cups 147 mounted on studs 149 on the box, ball bearings 151 being provided between the cups and the studs. One of these studs is hollow and receives a pin 153 having its inner end keyed to the double crank. On its outer end is a wheel 155 (Fig. 1). A sprocket chain 157 has one end connected to the wheel and its opposite end anchored to the cross-head at 159. This sprocket chain is looped about an idler sprocket wheel 161 on the lower end of an arm 163, the upper end of which is pivotally connected to the cross-head. This arm is urged to the right (Fig. 1) by a coil spring 165 encircling a rod 167 having one end connected to the arm. This rod projects through a hole in an L-shaped bracket 169 on the cross-head, the coil spring being confined between the bracket and a washer 171 on the rod and secured by a nut 173. The construction is such that the coil spring 165 will react against the bracket and urge the rod toward the right, thereby rocking the arm toward the right and the latter through the idler sprocket 161, and the sprocket chain 157 will turn the wheel 155 and the double crank in a contra-clockwise direction.

The toggles will intermittently have their straightened and buckled positions shown in Figs. 7 and 8 respectively. To hold the connecting rods in substantial alinement and the toggles in their straightened position, the double crank has a disk 175 (Figs. 11 and 12) formed to provide a nose 177 for engagement with a latch 179 (Figs. 1 and 7) on a vertical rod 181 mounted in an upper guide 183 secured to the top of the cross-head. The rod has a flat-sided portion 185 passing through a rectangular slot in the guide to prevent rotation of the rod and thereby hold the latch 179 in the same plane as the disk nose 177. The latch rod has a reduced cylindrical end portion 187 projecting into a guide 189 on the bottom wall of the cross-head box. A coil spring 191 encircles the latch rod and is confined between lugs 193 on the latch rod and the bottom of the guide 183. A split nut 195 is threaded to the rod, and after it has been given proper adjustment it is locked to the rod by a set screw. The construction is such that the coil spring 191 tends to hold the rod down in a position in which the nut 195 engages the top of the guide 183 which serves as a stop.

When the cross-head moves downward the clearer plate 17 referred to, will meet stops or bars 197 (Fig. 1) mounted on the bed plate at opposite ends thereof, said stops having dowels 199 (Fig. 2) adapted to enter holes in the bed plate. The construction is such that stops of different thicknesses may be used according to the thickness of the dough sheet.

The arrest of the clearer plate by its engagement with the stops and the continued downward movement of the cross-head, will cause compression of the clearer plate coil springs 25 and compression of the embosser coil springs 33. The compression of the embosser springs will tend to move the embosser-head upward relatively to the cutter-head, but this movement is prevented by engagement of the embosser-head with the shoes 113, and the pressure reacting from the shoes through the toggles and alined connecting rods. This pressure has a component of force which re-acts to the studs 125 which carry the toggles, and this pressure has a smaller component of force which presses the alined connecting rods toward each other.

The pressure which originates in the embosser springs and reacts on the connecting rods as described is a potential force which is available to throw the double crank from its position shown in Fig. 7 to its position shown in Fig. 8. When this occurs, the toggles receive a buckling motion which releases the shoes and allows the embosser springs to snap the embosser-head upward until limited by engagement with the stud heads 31.

Next will be described the improved mechanism for tripping the latch to move the double crank wrist pins out of a dead center or substantially dead center relation and thereby allow the releasing action of the toggle mechanism. This latch trip mechanism, in the present instance of the invention, comprises a spool 201 (Figs. 1 and 7) on a reduced upper end of the latch rod having a nut 203 thereon secured by a lock nut 205. The adjustment of these nuts preferably is such that the spool may have slight lost motion between the nut and the shoulder at the base of the reduced portion of the rod receiving the spool.

A bell-crank 207 is pivotally mounted on a bracket 209 on the cross-head, one of the arms of the bell-crank having a fork received by the groove of the spool. The other arm of the bell-crank is connected by a rod 211 with one arm of a bell-crank 213 pivotally mounted on a bracket 215 on the cross-head. The other arm of this bell-crank is pivotally connected to the upper end of an upright rod 217 at the rear side of the machine, the lower end of said rod being pivotally connected to an arm 219 of a bell-crank 221 (Figs. 3, 4 and 6). The other arm 223 of this bell-crank carries a follower in the form of a roller 225 which engages the periphery of a cam 227 mounted fast on the wrist pin 69 of one of the cranks which reciprocates the cross-head.

The cam has a long peripheral arc of uniform radius and a short peripheral arc of varying radius, the constuction being such that once in each rotation of the cam the follower will be moved outward somewhat, thereby rocking the bell-crank 221, which in turn will pull the rod 217 downward and rock the bell-cranks 207 and 213 on the cross-head, thereby causing the bell-crank 207 to shift the latch upward and turn the double crank sufficiently to throw its wrist pins off of their dead center relation. On occurrence of this event the potential force developed by the embosser springs becomes available to throw the double crank in a clockwise direction from its position shown in Fig. 7 to that shown in Fig. 8. The coil spring 165 referred to, which operates through the arm 163 and the sprocket chain 157, limits the throw-over movement of the double crank to an arc of about 180°. After the cross-head has moved upward sufficiently, the toggle mechanism will be automatically restored from its releasing position to its holding position by the coil spring 165 as assisted by the action of gravity on the shoes and toggles. To further assist this action and to assist in holding the follower against the cam, the bell-crank 207 may be provided with a heel arm 229 having a hole therein in which is threaded a stud 231 secured by a nut 233. At the lower end of this stud is a head 235, and between the latter and a step on the cross-head is confined a coil spring 239. By adjustment of the stud 231 relatively to the arm 229, the tension of the coil spring 239 may be varied.

The follower carrying bell-crank 221 is pivotally mounted on a pin 241 on a swivel in the form of a ring 243 which is carried by the strap 67 at the rear side of the machine. This ring is formed with a counterbore 245 receiving a flange 247 on the strap. On the opposite face of the flange from the ring is an arc-shaped gib or ring section 249 secured to the ring by screw bolts 251. The construction is such that the swivel or ring is connected to the strap and susceptible of rotative adjustment thereon, in order that the follower may be rotatively adjusted along the periphery of the cam to vary the timing of the tripping of the latch as required in embossing dough sheets of varying thicknesses.

To accomplish this adjustment, the swivel or ring is provided with a worm gear segment 253 which meshes with a worm 255 on the lower end of an upright shaft 257 journalled in two bearings in a bracket 259 projecting laterally from and integral with the strap. The upper end of the shaft 257 is journalled in a bracket 261 projecting laterally from the sleeve 97 referred to at the rear end of the cross-head. Fast on the upper end of the shaft 257 is a worm gear 263 meshing with a worm 265 on a shaft 267 extending parallel to the cross-head and having one end journalled in a bearing of the bracket 261 and its opposite end journalled in a bearing in a bracket 269 projecting from the sleeve 97 at the front side of the machine. Secured to the shaft is a hand wheel 271 (Fig. 1). The construction is such that the operator while standing at the front of the machine may turn the hand wheel 271, and through the connections described may rotate the worm 255 and thereby impart rotative movement to the toothed segment 253. This adjustment will move the follower 225 circumferentially of the cam 227 and vary the timing of the latch tripping operation suitably for dough sheets of varying thicknesses.

In the operation of the latch tripping mechanism, the cam will revolve with the crank wrist pin, but since the cam is fast on the wrist pin it will receive a complete rotation on its own axis in the course of the movement of the wrist pin through its orbit. As a consequence, once in each rotation of the cam its portion of varying radius will pass the follower and quickly and positively rock the follower bell-crank, and through the connections described the latch will be tripped with a quick positive movement.

As stated, sometimes it is desired to cut but not emboss biscuits, and therefore, it is desirable to provide means for preventing operation of the toggle mechanism at such time. To accomplish this, an interrupter may be provided, in the present instance, in the form of a hook 273 (Fig. 10) pivotally mounted on a stud 275 on the top of the cross-head. This hook has a handle 277 and a heel 279 carrying a pin 281 connected to one end of a coil spring 283, the opposite end of which is connected to a pin 285 on the cross-head. The construction is such that the operator may grasp the handle 277 and move the hook to a position in which it stands between the latch rod nut 195 and the stop 183. The coil spring 283 is so arranged that it will hold the hook 273 in its active and inactive positions. When the hook is between the nut and the stop, the cam follower will be held out of engagement with the cam, and the latch will stand in tripped position and the toggles will be in their buckled position. Therefore, the shoes will not engage the embosser-head and the embosser will not be pressed down to the dough sheet when the cross-head moves downward.

It is the duty of the operator of the machine to watch the dough sheet as it travels from the gage rolls to the cutters and embossers for the purpose of detecting lumps or other irregularities in the dough sheet which, if engaged by the embossers, might clog the same and result in imperfect work. It is desirable, therefore, to have provision for quickly and easily momentarily interrupting the embossing operation. To accomplish this, an interrupter is provided in the form of a hook 287 (Fig. 10) pivotally mounted on a screw bolt 289 on the cross-head. A rod 291 has one end connected to the hook and extends along the cross-head toward the front of the machine. The rod extends through a hole in a bracket 293 (Fig. 1), and a coil spring 295 encircling the rod is confined between the bracket and a knob 297 on the end of the rod, the tendency of the spring being to rock the hook away from the latch rod to its inactive position. When the operator desires momentarily to interrupt the embossing operation, he grasps the knob and presses the rod inward, thereby rocking the hook to a position in which it is between the nut 195 and the stop 183. This will hold the latch in tripped position, and the toggles will be in their buckled position so that the embossers will not be moved down to the dough sheet on the downward movement of the cross-head. When it is desired to resume the embossing operation, the operator releases the knob 297 and the spring 295 automatically shifts the hook 287 to its inoperative position.

The hooks are located on the cross-head at opposite sides of the latch rod, as will be noted in Fig. 10. Preferably the hook 273 is made somewhat thicker than the hook 287, in order to hold the follower well away from the cam when it is desired to set the machine for cutting but not embossing. It will be understood that either one of the interrupter hooks may be adjusted into position between the nut and the stop, but that only one of these hooks is in said position at one time.

The crank mechanism for reciprocating the cutter and embosser carrier horizontally is so timed with respect to the vertical reciprocations of the cross-head and with respect to the travel of the apron, that the cutters and embossers travel horizontally in unison with the apron and the dough sheet for the moment the embossers and cutters are in engagement with the dough sheet. Obviously it is unnecessary that the cutters and embossers shall travel in unison with the apron and dough sheet at other times.

The quick positive snapping of the embossers from the dough sheet, as occasioned by the quick release by the toggle mechanism of the embosser-head to the action of the embosser springs, and the use of crank motions for reciprocating the cross-head vertically and horizontally, permit the machine to operate at high speed, and at the same time accomplish work of superior quality.

It will be understood that the invention is not limited to the specific embodiment shown, and that various deviations may be made therefrom without departing from the spirit and scope of the appended claims.

What is claimed is:

1. A machine for cutting and embossing articles from sheet material, comprising, in combination, a cross-head, an embosser carried by the cross-head, a shaft, means including cranks on the shaft for reciprocating the cross-head to move the embosser toward and from the material, embosser retracting means energized on movement of the embosser toward the material, and a control device for the retracting means including a latch on the cross-head, and means actuated from the crank shaft for automatically tripping the latch to render the retracting means effective to snap the embosser away from the material.

2. A machine for cutting and embossing articles from sheet material, comprising, in combination, a cross-head, means for reciprocating the cross-head, an embosser carried by the cross-head and reciprocated thereby toward and from the material, and means for automatically intermittently retreating the embosser from the material including embosser retracting means energized on movement of the embosser toward the material and a cam for rendering the retracting means effective to retract the embosser from the material.

3. A machine for cutting and embossing artciles from sheet material, comprising, in combination, a reciprocable cross-head, an embosser and a cutter carried by the cross-head and moved thereby toward and from the material, spring means for retracting the embosser and energized on movement of the embosser toward the material, and a control device for the spring means, a latch on the cross-head, and a cam and follower for tripping the latch to allow the spring means to snap the embosser away from the material on completion of the embossing operation.

4. A machine for cutting and embossing articles from sheet material, comprising, in combination, a cross-head, an embosser carried by the cross-head and moved thereby toward and from the material, embosser retracting means energized on advance of the cross-head toward the material, and a control device for the retracting means including a pair of toggles on the cross-head, a pair of cranks having diametrically opposed wrist pins, connecting rods extending from the toggles to the wrist pins, a latch cooperating with the cranks for holding the connecting rods substantially in alinement, and means including a cam automatically to trip the latch when the embosser completes the embossing operation, thereby to allow the energized embosser retracting means to buckle the toggles, throw the connecting rods out of alinement, and retract the embosser from the material.

5. A machine for cutting and embossing articles from sheet material, comprising, in combination, a cross-head, an embosser and a cutter carried by the cross-head, means to reciprocate the cross-head, embosser retracting means energized by advance of the cross-head toward the material, and toggle means on the cross-head operable to prevent operation of said retracting means, a latch cooperating with the toggle means, and means including a cam for automatically tripping the latch to release the toggle means and allow the embosser retracting means to retreat the embosser from the material.

6. A machine for cutting and embossing articles from sheet material, comprising, in combination, a cross-head, an embosser and a cutter carried by the cross-head, spring means energized on movement of the cross-head toward the material and adapted to snap the embosser away from the material, and means for rendering said spring means effective including a latch on the cross-head, a cam having an arc of uniform radius and an arc of varying radius, a follower for the cam, and connections extending from the follower to the latch for tripping the same to render the spring means effective to snap the embosser away from the material.

7. A machine for cutting and embossing articles from sheet material, comprising, in combination, a cross-head, an embosser and a cutter carried by the cross-head, spring means for retracting the embosser from the material, and means for rendering the spring means effective including a latch on the cross-head, and means for tripping the latch including a cam, a follower for the cam, and means to adjust the follower relatively to the cam, thereby to vary the timing of the retreat of the embosser from the material.

8. A machine for cutting and embossing articles from sheet material, comprising, in combination, a cross-head, an embosser carried by the cross-head, spring means energized on advance of the cross-head toward the material for retracting the embosser from the material, and means for rendering the spring means effective including a latch on the cross-head, a cam, a follower for the cam, and connections between the follower and latch including a bell-crank on the cross-head.

9. A machine for cutting and embossing articles from sheet material, comprising, in combination, a cross-head, an embosser carried by the cross-head, means for reciprocating the cross-head toward and away from the material, spring means energized on advance of the cross-head toward the material and adapted to retract the embosser from the material, a latch on the cross-head, a cam, a follower for the cam, connections between the follower and the latch, and means for adjusting the follower relatively to the cam including connections extending from the follower to the front of the machine.

10. A machine for cutting and embossing articles from sheet material, comprising, in combination, a cross-head, an embosser carried by the cross-head, spring means for retracting the embosser from the material, means for rendering the spring means effective including a latch on the cross-head, a cam, a follower for the cam, and means for adjusting the follower relatively to the cam including a worm and worm gear segment.

11. A machine for cutting and embossing articles from sheet material, comprising, in combination, a cross-head, an embosser carried by the cross-head, spring means for retracting the embosser from the material and energized on advance of the cross-head toward the material, and means for rendering the spring means effective including a latch on the cross-head, a bell-crank on the cross-head cooperating with the latch, a cam, a follower for the cam, a bell-crank carrying the follower, and connections between said bell-cranks.

12. A machine for cutting and embossing articles from sheet material, comprising, in combination, a cross-head, an embosser carried by the cross-head, spring means energized on advance of the embosser toward the material for retracting the embosser from the material, and means for rendering the spring means effective including a spring-pressed latch on the cross-head, a cam, a follower, and connections between the follower and latch for tripping the latch.

13. A machine for cutting and embossing articles from sheet material, comprising, in combination, a cross-head, an embosser carried by the cross-head, a shaft, cranks on the shaft, straps on the cranks, connecting rods extending from the straps to the cross-head, a cam mounted on one of the cranks, a member swivelled on the strap carrying the cam, a follower for the cam carried by the swivelled member, spring means energized on advance of the cross-head toward the material for retracting the embosser, and means for rendering the spring means effective including a latch on the cross-head, connections extending from the follower to the latch, and means to turn the swivelled member thereby to vary the relation of the follower with the cam.

14. A machine for cutting and embossing articles from sheet material, comprising, in combination, a cross-head, an embosser carried by the cross-head, a shaft, cranks on the shaft, and connecting rods between the cranks and the cross-head for reciprocating the latter, spring means energized on movement of the cross-head toward the material for retracting the embosser, a pair of toggles on the cross-head, a double crank, connecting rods connecting the toggles and the double crank, a latch cooperating with the double crank to hold the toggles in straightened position while the cross-head advances toward the material, and means including a cam for tripping the latch to allow buckling of the toggles and snapping of the embosser from the material by said spring means on completion of the embossing operation.

15. A machine for cutting and embossing articles from sheet material, comprising, in combination, a cross-head, an embosser and a cutter carried by the cross-head, spring means energized on advance of the cross-head toward the material for retracting the embosser from the material, and means for rendering the spring means effective including a latch on the cross-head, a cam, a follower for the cam, connections between the follower and latch for tripping the latch intermittently, and an interrupter device for holding the follower away from the cam to prevent the embossing operation.

16. A machine for cutting and embossing articles from sheet material, comprising, in combination, a cross-head, an embosser and a cutter carried by the cross-head, means for reciprocating the cross-head, spring means energized on advance of the embosser toward the material for retracting the embosser from the material, and means for rendering the spring means effective including a latch on the cross-head, a cam, a follower for the cam, connections between the follower and the latch, and an interrupter on the cross-head cooperating with the latch to interrupt the embossing operation.

17. A machine for cutting and embossing articles from sheet material, comprising, in combination, a cross-head, an embosser and a cutter carried by the cross-head, spring means energized on advance of the cross-head toward the material for retracting the embosser from the material, and means for rendering the spring means effective including a latch on the cross-head, a cam, a follower for the cam, connections between the follower and latch for tripping the latch intermittently, an interrupter on the cross-head, and a member on the cross-head for adjusting the interrupter into a position to cooperate with the latch to interrupt the embossing operation.

18. A machine for cutting and embossing articles from sheet material, comprising, in combination, a cross-head, an embosser and a cutter carried by the cross-head, spring means energized on advance of the cross-head toward the material for retracting the embosser from the material, and means for rendering the spring means effective including a latch on the cross-head, a cam, a follower for the cam, connections between the follower and latch for tripping the latch, a hook on the cross-head, a manually operable member for moving the hook to a position to cooperate with the latch and interrupt the embossing operation, and a spring cooperating with said member for automatically moving the hook away from the latch to resume the embossing operation.

19. A machine for cutting and embossing articles from sheet material, comprising, in combination, a cross-head, an embosser and a cutter carried by the cross-head, spring means energized on advance of the cross-head toward the material for retracting the embosser, a pair of toggles on the cross-head, a double crank, connecting rods between the toggles and double crank, a spring-pressed latch cooperating with the crank for holding the toggles in straightened position, means including a cam for tripping the latch to allow buckling of the toggles and retracting of the embosser by the spring means, and a pair of hooks mounted on the cross-head of different thicknesses and cooperating with the latch, one for temporarily interrupting the embossing operations, and the other for preventing the embossing operation when it is desired to cut articles without embossing them.

THOMAS L. GREEN.